INVENTOR:
ROELOF M. M. OBERMAN
BY Michael S. Striker
Agt.

Aug. 26, 1952 R. M. M. OBERMAN 2,608,615

AUTOMATIC TELEGRAPH SYSTEM CONTROLLED FROM THE TELEPRINTER KEYBOARD

Filed July 30, 1947 3 Sheets-Sheet 2

INVENTOR:

ROELOF M.M. OBERMAN

BY: Michael S. Striker

Att.

Aug. 26, 1952 R. M. M. OBERMAN 2,608,615

AUTOMATIC TELEGRAPH SYSTEM CONTROLLED FROM THE TELEPRINTER KEYBOARD

Filed July 30, 1947 3 Sheets-Sheet 3

INVENTOR.
ROELOF M. M. OBERMAN
BY: Michael S. Striker
Att.

Patented Aug. 26, 1952

2,608,615

UNITED STATES PATENT OFFICE 2,608,615

AUTOMATIC TELEGRAPH SYSTEM CONTROLLED FROM THE TELEPRINTER KEYBOARD

Roelof M. M. Oberman, The Hague, Netherlands

Application July 30, 1947, Serial No. 767,524
In the Netherlands December 18, 1942

Section 1, Public Law 690, August 8, 1946
Patent expires December 18, 1962

6 Claims. (Cl. 178—2)

Figure 1:
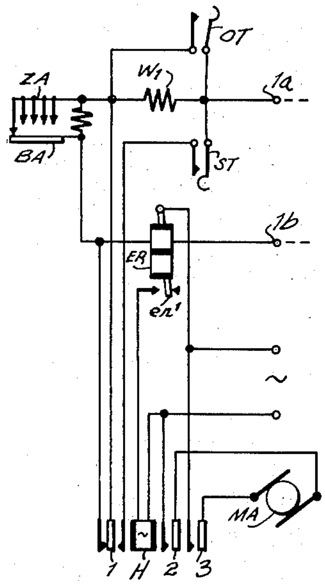

The present invention relates to a signalling system, and particularly to systems in which connections between subscribers of one or various exchanges are built up over selectors which are positioned under the control of signals in the telegraph permutation code preferably transmitted from the keyboard of a teleprinter set in this system.

According to the invention, in the exchanges in the systems of this kind, a novel apparatus is provided for checking the selecting signals, received in the sequence of units of a permutation code. This checking apparatus is applied to the storage apparatus as described in my co-pending application Serial No. 772,407, filed September 5, 1947, now Patent No. 2,546,369.

Furthermore, according to the invention a supervisory relay is provided which can break the connection as far as it has been built up, by interrupting the connection between the calling subscriber and his exchange. According to another feature of the invention, the armature of the supervisory relay is attracted upon the storage of a signal which is different from the selecting signals.

According to another feature of the invention, a sequence switch is provided which connects the supervisory relay by means of successive action of the contacts of the switch successively to a part of the checking apparatus covering the checking of an initiation signal preceding the selecting signals, to the part covering the checking of the selecting signals and optionally to the part covering the checking of the closing signal thereto.

According to still another feature of the invention an arrangement is provided which interrupts the connection as far as it has been built up after the reception of the selecting signals if any signals enter the arrangement before the connection with the desired subscriber is made. This serves also to avoiding false positioning of the selectors.

In the normal telegraph junction systems with building up of a connection by means of numerical current impulses this danger does not exist, as the teleprinter-motor of the telegraph apparatus is only switched on after the connection is effected, but in the systems of the type to which the invention relates, the motor of the calling teleprinter has to be switched on before, since it has to operate for the transmission of the selecting signals.

The safeguarding which the arrangement of the invention aims to provide might be given by the storage and checking apparatus supervising the selecting signals. As preferably the register is provided with this relay, it would be necessary to maintain a connection between the register and the calling subscriber over a brush of the switch which connects the register with the junction circuit during the positioning of the successive selecting stages.

According to another feature of the invention this drawback is avoided by providing the junction circuit with a control arrangement in which a supervisory relay is energized and thus breaks the connection of the calling subscriber with the exchange on the entrance of signals, which may be part of a telegraph message, after the reception of the selecting signals but before the desired connection is made.

From the foregoing it will be evident that the selectors are positioned by a permutation code. These selectors may be of the type disclosed in the U. S. Patent No. 1,588,764 to Lubberger; but also any other selector positioned by a permutation code may be used.

The invention will be described by way of example in a telegraph system employing the five-unit permutation code.

Figure 2:
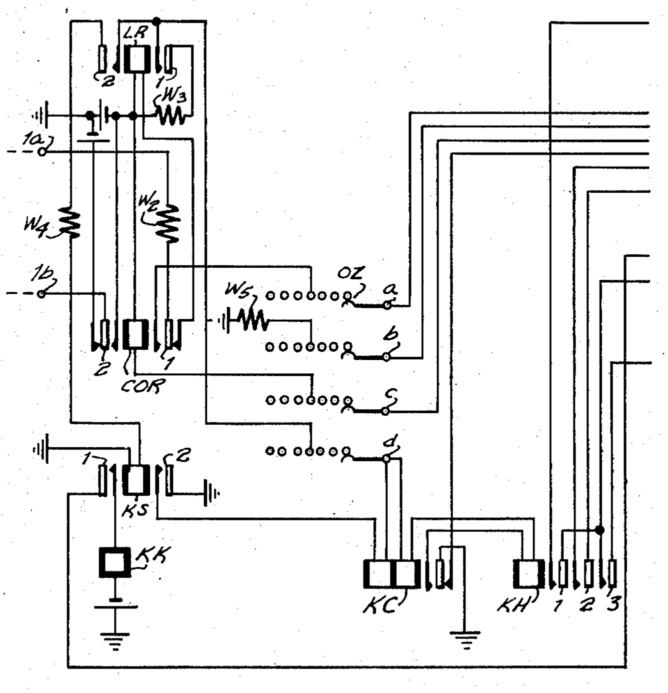
Figure 3:
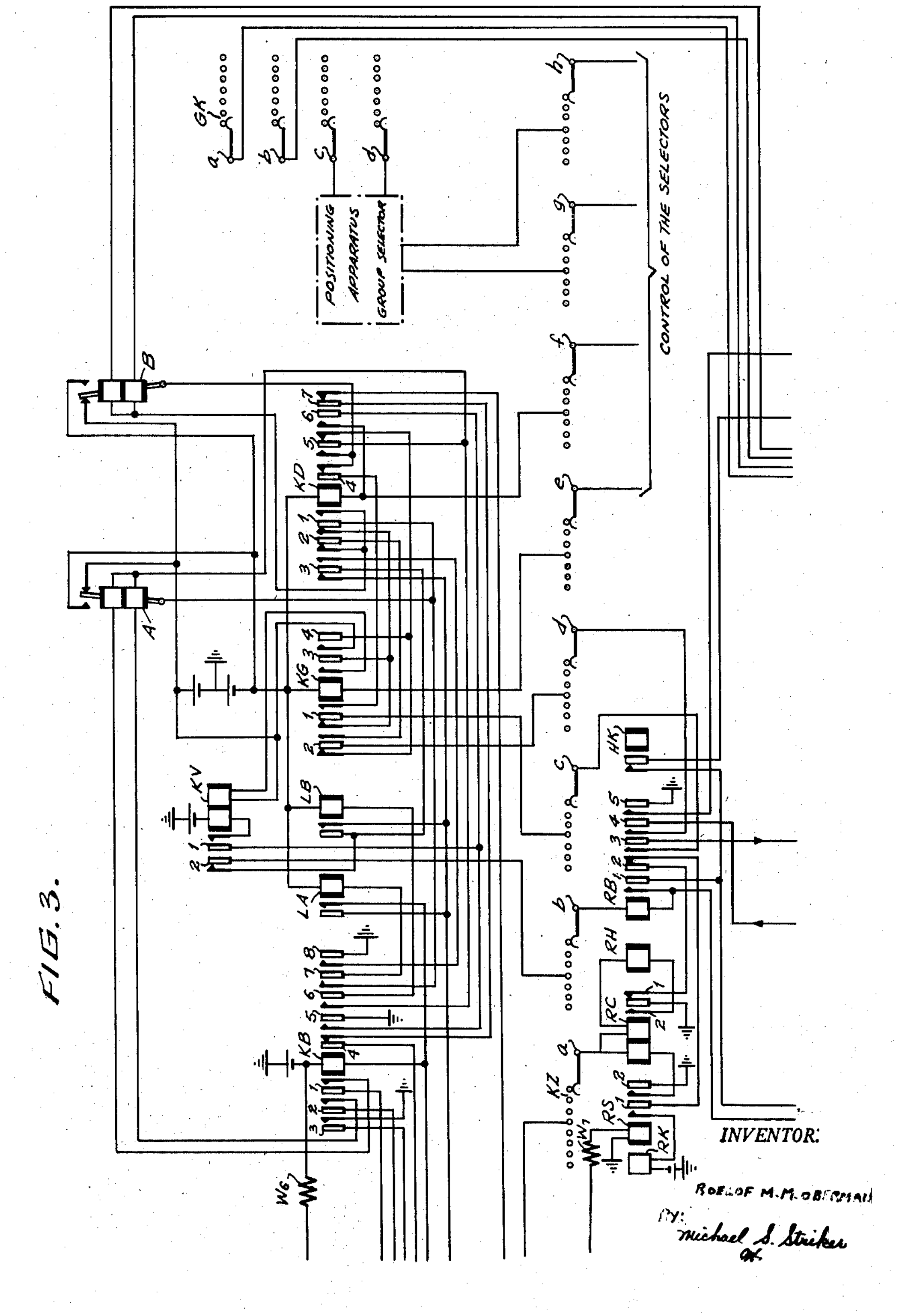
Figure 5:
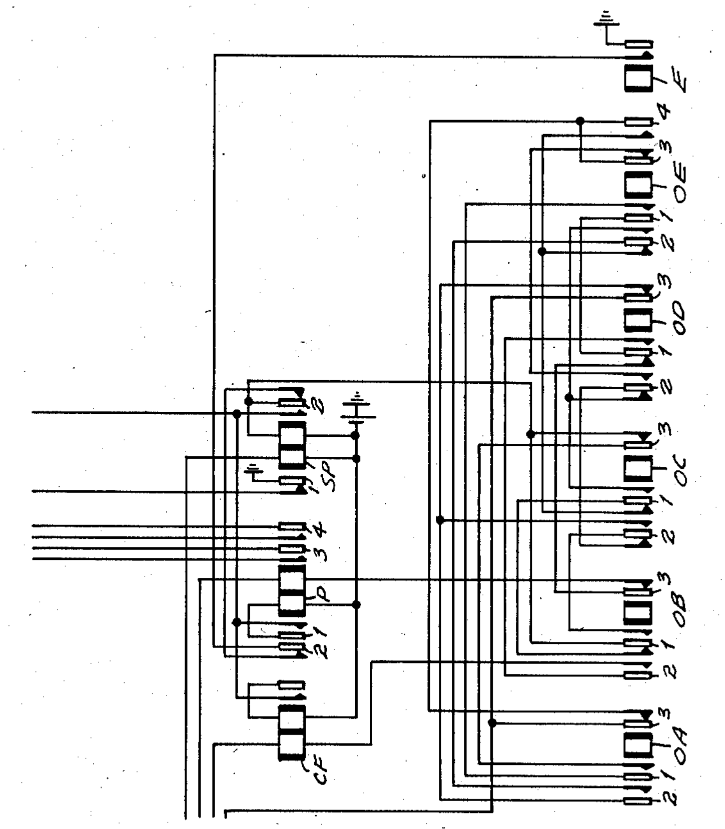
Figure 4:
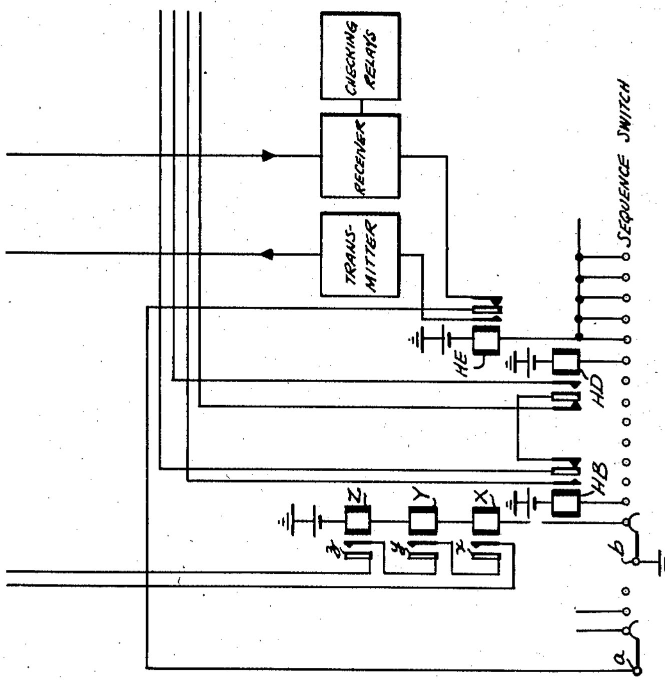

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 shows diagrammatically the arrangement of a subscriber's station;

Fig. 2 placed at the right hand side of Fig. 1 shows the connection of a subscriber's line to an automatic exchange;

Fig. 3 placed at the right hand of Fig. 2 shows the junction circuit in the exchange;

Fig. 4 shows in a block diagram that part of the register which concerns the invention; and Fig. 5 shows an embodiment of the checking apparatus of the register.

Figure 6:
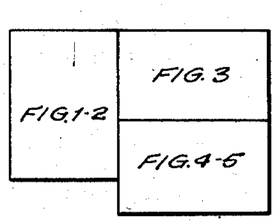

Both Figs. 4 and 5 are to be placed below Fig. 3, the arrangement of the various figures being shown in Fig. 6.

Fig. 1 shows, in a simplified form, the arrangement of a subscriber's station for a two-wire local circuit. The invention, can, however, also be applied to subscriber stations with four-wire local circuits (which are mostly single current) or with district subscribers (double current), while it can also be used in the traffic over various automatic telegraph exchanges.

The wires 1*a* and 1*b* connect the subscriber's station with the automatic telegraph exchange. In the absolute non-operative position a current of about 5 ma. flows through the subscriber's loop in such a direction that the contact $er^1$ of the polarized relay ER is in the shown position. The relay H is not energized and the motor MA of the teleprinter is stopped.

In the automatic exchange the connection of a subscriber ends in a circuit comprising relays LR and COR which are shown in Fig. 2.

In the absolute non-operative position a current of 5 ma. flows through the subscriber's loop, which passes from telegraph battery, over relay LR, back contact *cor*1, resistance W2, conductor 1*a*, resistance W1, back contact *h*1, relay ER, conductor 1*b*, back contact *cor*2 to minus telegraph battery. The relay LR is not energized by this 5 ma. current, while the polarized relay ER inverts its armature on this current.

Fig. 2 shows the part of the exchange where the calling subscriber's line ends in the line finders of which line finder OZ is shown with four brushes *a–d*. Brushes *a* and *b* are for wiring purposes in the connection; the brush *c* is for the busy indication of a particular subscriber, and brush *d* is used as a test brush searching for the calling outlet. The line finder OZ is operated by a magnet KK. The other parts shown in Figs. 1 and 2 will be clearly set forth hereinafter in the description of their operation.

Fig. 3 represents the junction circuit in the exchange with the repeater and a cord-finder KZ with its operating magnet RK. The cord-finder KZ tests for a free register by means of its brush *a*; when found the register receives and stores the data transmitted by the calling subscriber over its brush *c*, at the end of which the sequence switch switches the registering relays of the register to the transmission device which transmits the stored data as indicated in Fig. 4 over the brush *d* of KZ to the selectors of which only one group selector GK is shown. In Fig. 3 is also shown the supervisory arrangement with relay KV which reacts to too precipitate signals when the connection with the desired subscriber is not yet established, which would otherwise result in faulty positioning of the selectors.

Fig. 5 shows the checking arrangement in which a supervisory relay SP has two windings operating in opposition to each other. First a relay CF (termed hereinafter "the first testing relay") is energized on the initiating signal while a relay P (termed hereinafter "the second testing relay") indicates the end of the selecting signals.

OPERATION OF THE SYSTEM

(*a*) *Seizure of a free register*

To obtain a connection in this system with a wanted subscriber the calling subscriber has to be allotted first to a free register to store the data concerning the wanted subscriber.

As described a 5 ma. current flows through the subscriber's apparatus and its loop in such a direction that the armature $er^1$ of the polarized relay ER is in the shown position.

To engage a free register the subscriber presses the calling key OT which short-circuits a resistance W1, which is so dimensioned that it reduces the current flow from 40 ma. to 5 ma. when arranged in the circuit. When this resistance is short-circuited the current will increase to 40 ma.

In the automatic exchange this increase forms the criterion for connecting a free junction circuit to the subscriber's station—and as the description will be given here for a register system—for engaging a free register.

To this increase of current the line relay LR (Fig. 2) responds and inverts its armatures 1 and 2. Armature 1 of relay LR connects the minus pole of the battery with the contacts in the *d*-arch of a group of line finders over the resistance W3, while armature 2 of relay LR engages the group of line finders via a number of auxiliary relays of which only the start-relay KS is shown. The relay KS closes with its armature 1 a circuit for the magnet KK of the line finder OZ.

The group of line finders steps or rotates, dependent on their nature, through the contacts in the arches testing the subscribers until one of them reaches the calling member. If it is assumed that the shown line finder OZ reaches the calling line first, then the relay KC is energized in a circuit from ground, over armature 2 of relay KS, high resistance winding of the test relay KC, brush *d* of line finder OZ, armature 1 of relay LR, resistance W3 to minus battery.

When relay KC is energized, the circuit of the operating magnet KK is interrupted by the armature of relay KC, which closes now a holding circuit for the low resistance winding of relay KC, in series with relay KH which is operated.

Relay KS will now release its armatures due to the potential drop at the *d*-brush. If there are no other calls in this group of line finders the still rotating line finders will stop. To assure this release resistance W4 is provided in series with relay KS.

The operated slowly releasing relay KH of the engaged junction circuit connects by means of its armature 1 minus pole battery with certain contacts in the *a*-arches of the cord finders of which KZ is shown in Fig. 3. Armature 3 of relay KH closes a circuit for the start relay RS of the group of cord finders. This relay RS is operated in the circuit from ground over resistance W7, contact 3, and contact 1 of relay KH, resistance W6, minus battery to ground.

Relay RS attracts, when energized, its armature 1 which forms the circuit for the operating magnet RK of the cord finders KZ belonging to a group of free registers, so that the calling junction circuit can be connected to a free register. The circuit formed for the operating magnet RK of the cord finder KZ leads from ground over armature 1 of relay RC, contact 2 of relay RB, contact 1 of relay RS, magnet RK, minus battery to ground. Armature 2 of relay RS connects ground to the test circuit of the test relay RC.

If it is assumed that the shown cord finder KZ reaches the calling cord circuit first, relay RC is energized when the cord circuit is reached in a circuit from ground, contact 2 of relay RS, high ohmic winding of RC, brush *a* of KZ, contact 1 of relay KH, resistance W6, minus battery to ground.

Relay RC forms a holding circuit over its armature 1 and its low ohmic winding in series with the auxiliary relay RH. Owing to the inversion of armature 1 of relay RC, the circuit of the magnet RK is interrupted so that the cord finder is stopped.

In the same way as described for the line finders, the group of cord finders is stopped by de-magnetization of the start-relay if no other calling cord is present.

The register comprises a number of devices which are positioned when storage takes place e. g. a sequence switch which will be referred to hereinafter.

When the register is not positioned the contacts *x*, *y* and *z* (Fig. 4) are closed. As a result of this a circuit for the relay RB of the register and the relay KB of the junction circuit is closed from ground, contact 1 of relay SP (Fig. 5), contact of relay HK (Fig. 3), contacts *z*, *y* and *x* (Fig. 4), relay RB (Fig. 3), wiper *b* of cord finder KZ, contact 2 of relay KV, back contact 3 of relay KD, front contact 2 of relay KH (Fig. 2), relay KB, minus battery to ground. In this circuit the front contact of 2 of relay KH is closed by the operation of the auxiliary relay KH in the test circuit of the line finder. A free register is engaged now. Relay RB by means of its armature 2, prevents the operation of the cord finder on an incoming call in the group, while armature 1 forms a holding circuit for its own relay RB.

(*b*) *Starting of the teleprinter-motor*

Relay KB (termed hereinafter "the first relay") closes now the circuit for the telegraph repeating coils A—A in the *a* and *b* wires by means of its armatures 1 and 2. The closing of the contact 7 of relay KB results in energizing the slowly releasing relay LA in a circuit from + battery over contact 7 of relay KB, relay LA to minus battery, while contact 6 of relay KB energizes the slowly releasing relay LB in a circuit from ground (Fig. 2), brush *b* of line finder OZ, contact 2 of relay KB, auxiliary repeating coil A, contact 6 of relay KB, relay LB minus battery to ground.

The opening of contact *kb*4 prevents a faulty operation of line finder OZ on a new call.

Armature 3 of relay KB closes a circuit for the cut off relay COR: ground, contact 3 of relay KB, brush *c* of line finder OZ, relay COR, minus battery to ground. Relay COR now attracts its armatures 1 and 2, so that the current direction in the subscriber's loop is reversed and leads over brush *a* of line finder OZ, the junction circuit, brush *b* of line finder OZ to ground.

The polarized relay ER inverts its armature $er^1$ so that the A. C. relay H is energized, inverting its armatures 1, 2, and 3. The resistance W1 is now short-circuited over front contact 1 of relay H, so that the calling key OT may be released.

By means of the contacts 2 and 3 of relay H the teleprinter motor MA receives A. C. from the source and starts rotating. The transmission contacts ZA are switched on by the inversion of armature 1 of relay H.

(*c*) *Restoring of the test relays to normal*

Owing to the inversion of armature 1 of relay COR the line relay LR is de-energized so that its armatures 1 and 2 are re-inverted into the shown position.

The re-inverted armature 1 of relay LR interrupts the operation circuit of the test relay KC and the auxiliary relay KH and their armatures return to the shown position.

The armature 1 of relay KH on its turn interrupts the test circuit of the cord finder KZ and relay RC is restored to normal and so is its armature.

The armature 2 of relay KH also returns to the shown position, however, the circuit for relays KB and RB is not interrupted owing to the shunt by the armature 1 of relay LA.

The register is now ready to receive the data concerning the wanted subscriber.

(*d*) *Reception of the selecting signal by the register*

Fig. 4 shows diagrammatically the arrangement of a register. The signals concerning the numerical indication of the desired subscriber from the calling subscriber are received in the register over one of the brushes of the cord finder KZ. These signals consist of interruptions of the current in the subscriber's loop. The receiving relay A in the junction circuit is provided with a line winding and a compensation winding. The line winding receives an energization that is about twice as strong as that of the compensation winding. In consequence of an interruption of the current in the subscriber's loop the armature of the relay A is inverted, while it moves back when the line is closed. The impulses which are received thus from a single current two-wire line are passed on to a receiving device in the register from battery over armatures of relay A, contact 1 of relay KD, brush *c* of cord finder KZ and contact 3 of relay RB.

The receiving device is of the kind in which the received signals are registered by means of five selecting relays (not shown), the energization combination of which is characteristic for the signal.

The register contains a sequence switch, which connects the five selecting relays (not shown) with the receiving device for registering the numerical indications. Furthermore the register contains a transmitting device, which transmits the numerical data after they are all registered in the register relays, e. g. to the selecting stages in its own exchange or to registers in other exchanges.

(*e*) *Checking of the received signals by the checking apparatus*

It has already been stated that the receiver of the selecting signals in this embodiment is the receiving device described in my co-pending patent application 772,407, filed September 5, 1947, now Patent No. 2,546,360, in which the relays are successively responsive to the first, second, third, fourth and fifth unit of the 5-unit permutation code, certain permutation code signals designating letters and others designating digits. A relay E operates when all the units of a signal are received.

This receiving device is connected to a group of checking relays OA—OE as shown in Fig. 5, controlling their armatures respectively. The contact of relay E is closed every time when the positioning of the relays OA—OE according to a signal is effected.

Since the signals and the selecting criteria in the system according to the invention are quite similar to each other, special measures should be taken which enable the register to ascertain whether a numerical selection has to be controlled or whether the seizing of the register is the result of a mistake of the operator, a disturbance, etc. These measures may be as follows:

*a*. The calling subscriber transmits the signal "figure" (starting signal) after the teleprinter has started;

*b*. Then the necessary digits are selected by pressing the relevant figure keys;

*c*. Then the register is started for its directing numerical function by pressing a special key e. g. "+," which signal is transmitted as closing signal.

If matters are not according to all of these conditions, the checking apparatus operates. The supervisory relay SP attracts its armature and interrupts the connection with the calling line by demagnetizing the relays RB and KB in a way which will be described presently.

The supervisory relay SP (Fig. 5) which operates in case of a disturbance is energized by two windings working in opposition after the reception of each selecting signal, which closes at the contact of relay E the circuit of the right-hand winding of relay SP over the contact 2 of relay P, while the circuit of the left-hand coil can be traced over a combination of contacts of the selecting relays of the receiver, which is arranged so that only for the ten signals in the five-unit code, which represent the digits 1–0, the left-hand winding of the supervisory relay SP is energized.

It is also possible to provide the supervisory relay SP with one winding only. The combination of contacts of the relays OA—OE should then be arranged so that only for the selecting signals no circuit for the relay SP can be found. This measure requires, however, more contacts on the selecting relays. From the foregoing it will be clear that only 12 signals are admitted in the system as described which will be described in the table listed below with the formed circuits.

the circuits of the relay RB and the relay KB. The register and the used junction circuit are then released and the teleprinter of the calling subscriber is stopped by demagnetization of the relay COR and by the interchanging of the poles of the subscriber's loop.

If the signal combination "figures" has been transmitted correctly by the subscriber, the calling subscriber then transmits the number of the wanted subscriber. The contact of relay E (Fig. 5) of the receiver is inverted again after the reception of each digit, that is every time after the contacts of the selecting relays have been positioned accordingly.

In case the received signals belong to the combinations which are to be admitted, a holding circuit is closed for both windings of the relay SP as a result of which this relay is not energized, so that after the reception of each digit the sequence switch can connect a following set of register relays with the receiver.

After the reception of a sufficient number of digits the register could already start the positioning of the successive selecting stages. A similar procedure is applied in automatic telephone systems. If one would wait in the last mentioned systems until the calling subscriber has transmitted all the digits, an inadmissible delay would be the result. In automatic telegraph systems in which the selectors are positioned by the signals of the telegraph code, it has certain advantages to have first the calling

| Signal | Unit | | | | | Formed Circuit |
|---|---|---|---|---|---|---|
| | 1 | 2 | 3 | 4 | 5 | |
| fig | o | o | | o | o | *e*, *p*2, *sp*2, *oc*3, *oa*1, *oe*1, *od*1, *ob*2, CF, *hb*, SP. |
| 1 | o | o | o | | o | *e*, *p*2, *sp*2, *ob*1, *oc*2, *od*3, *hd*, *hb*, SP. |
| 2 | o | o | | | o | *e*, *p*2, *sp*2, *ob*1, *oc*2, *od*2, *oe*2, *oa*2, *od*3, *hd*, *hb*, SP. |
| 3 | o | | | | | *e*, *p*2, *sp*2, *ob*1, *oc*1, *oe*2, *oa*2, *od*3, *hb*, *hd*, SP. |
| 4 | | o | | o | | *e*, *p*2, *sp*2, *ob*1, *oc*2, *od*2, *oe*3, *oa*3, *hd*, *hb*, SP. |
| 5 | | | | | o | *e*, *p*2, *sp*2, *ob*1, *oc*1, *oe*4, *oa*3, *hd*, *hb*, SP. |
| 6 | o | | o | | o | *e*, *p*2, *sp*2, *ob*1, *oc*1, *oe*2, *oa*2, *od*3, *hd*, *hb*, SP. |
| 7 | o | o | o | | | *e*, *p*2, *sp*2, *ob*1, *oc*2, *od*3, *hd*, *hb*, SP. |
| 8 | | o | o | | | *e*, *p*2, *sp*2, *ob*1, *oc*2, *od*3, *hd*, *hb*, SP. |
| 9 | | | | o | o | *e*, *p*2, *sp*2, *ob*1, *oc*1, *oe*4, *oa*3, *hd*, *hb*, SP. |
| 0 | | o | o | | o | *e*, *p*2, *sp*2, *ob*1, *oc*2, *od*3, *hd*, *hb*, SP. |
| + | o | | | | o | *e*, *p*2, *sp*2, *oc*3, *oa*1, *oe*1, *od*1, *ob*3, P, *hd*, *hb*, SP. |
| | OA | OB | OC | OD | OE | |

As there are only 10 digits in the progression from 1–(1)0 the checking apparatus is so designed that only then a circuit is formed for the second winding of relay SP.

The series of numbers determining the wanted subscriber, however, is preceded by the signal "figures."

The sequence switch has then inverted the contact of relay HB from the shown position, so that the left-hand winding of the relay CF is in series with the second winding of the relay SP. The combination of contacts which is included in the series-arrangement of the two relay windings, is arranged so that a circuit is only formed, if the receiving signal combination is "figures." The relay CF is energized and forms a holding circuit for itself over the contacts of relay CF and 5 of relay RB.

The relay SP remains unenergized owing to the fact that its two windings are magnetized in opposite directions. The energization of the relay CF directs the sequence switch to the position in which the following signals are registered, at the same time the contact of relay HB is moved back to the shown position.

The relay SP attracts its armature at the reception of the first signal from the calling subscriber for all other signal combination than "figures." The contact 1 of relay SP interrupts subscriber transmit all the digits before beginning to position the selecting stages In this way, the parts necessary for the seizing of the various junction circuits and trunk circuits, are reduced to a minimum.

The delay in the positioning of the selecting stages may be neglected owing to the rapid selection (7 digits per second).

In Fig. 4 the contact of relay HD is inverted when all the selecting digits have been received. The left-hand winding of the relay SP is then arranged in series with the right-hand winding of the relay P. Relay P can only operate if the correct closing signal "+" (xooox) is transmitted and received. The positioning of the selectors begins after the energization of the relay P which is energized after the termination of the selecting signals.

(*f*) *Release by SP after a wrong signal*

Let it be assumed that the signal "letters" consisting of five marking units is received in this series of signals, which can occur by wrong keying, by faulty repeating, etc. All the receiving relays become energized inverting their armatures. No circuit can be found now for the second winding of relay SP. The supervisory relay SP operates in a circuit from ground over contact of relay E, contact 2 of relay P, back contact 2 of relay SP, relay SP, minus battery to ground.

Armature 2 of relay SP is inverted and forms a holding circuit for the operated winding of relay SP over front contact 5 of relay RB, while armature 1 of relay SP interrupts the operation circuit in Fig. 3 of relays RB and KB by breaking the holding ground in the circuit ground, back contact 1 of relay SP, back contact 1 of relay HK, front contact 1 of relay RB, relay RB, *b* brush of cord finder KZ, back contact 2 of relay KV, front contact 1 of relay LB and back contact 3 of relay KD, front contact 1 of relay LA, relay KB, minus battery to ground.

Relay RB releases its armatures. The contact 1 of relay RB is opened to prevent the operation of the relays RB and KB when armature 1 of relay SP returns to normal. While armatures 3 and 4 of relay RB disconnect the register relays armature 5 of relay RB interrupts the operation of relays CF, P and SP by opening the circuit to ground.

Relay KB also releases its armatures. Armatures 1 and 2 of relay KB break the junction circuit, while the re-inversion of armatures 6 and 7 of relay KB restores relays LB and LA to normal. Armature 3 of relay KB interrupts the circuit of the cut-off relay COR so that the current direction in the subscriber's loop is re-inverted, owing to which the polarized relay ER interrupts the motor circuit by its armature $er^1$. The teleprinter motor stops and the system is restored to normal.

*(g) Transmission of the stored data by the register*

If no undesired signal has been found, the data concerning the wanted subscriber ended by the signal "+" admit relay P to operate in a circuit from ground, front contact of relay E, back contact 2 of relay P, back contact 2 of relay SP, back contact 3 of relay OC, front contact 1 of relay OA, front contact 1 of relay OE, back contact 1 of relay OD, back contact 3 of relay OB, relay P, sequence switch, contacts of relays HD and HB, relay SP, minus battery to ground.

Armature 2 of relay P now closes a holding circuit for its relay. The armatures 3 and 4 of relay P close a circuit for the register to the group selector GK.

The relay KG will now be operated from ground in the register to telegraph battery and will attract its armatures.

The relay KG (termed hereinafter "the second relay") prepares a circuit by its armature 3 for the right hand winding of relay KV of the supervisory arrangement. The relay KV is arranged in a circuit from plus telegraph battery, right hand winding of relay KV, front contact 3 of relay KG, the back contact 1 of relay KD, which is energized when the desired connection is established, and the armature of receiving relay A to plus telegraph battery. As long as the calling subscriber is not transmitting signals of the message the relay KV remains de-energized. The positioning of the selecting stages in the own exchange may be accomplished according to known methods, under the control of the register. The positioning of the selecting stages in other exchanges can be effected through an interchange of telegraph signals between the registers of the exchanges. If the desired connection is established, the relay KD is energized from the register. This relay closes a holding circuit for itself over its contact 6, it releases the register and cord finder KZ by means of its contact 3, breaks the connection of the transmitting and the receiving apparatus of the register with the subscriber's lines at its contacts 2 and 4, and connects the circuits of both subscribers telegraphically over contacts 1 and 5 of relay KD while relay KV is released. The telegraph traffic between the subscribers can start now.

If however the desired subscriber is busy contact 1 of relay HK is opened which results in the de-energization of the relays RB and KH. The connection will be released then in the way described heretofore under *e*.

*(h) Checking arrangement with supervisory relay KV*

The safeguard according to the invention is provided by the relay KV in the junction circuit which relay can only be energized during the positioning of the selectors.

If the calling subscriber does not transmit a signal before the connection with the desired subscriber is seized the relay KV remains de-energized. If the calling subscriber however, transmits a signal, the relay KV is energized on the start-impulse of the first signal. Then the relay KV forms a holding circuit for itself over its left-hand winding, front contact 1 of relay KV, and front contact 5 of relay KB. Then the relay KV interrupts the series arrangement of the relays RB and KB by means of the armature 2 of relay KV, so that the register is released and the calling subscriber's apparatus returns to the absolute rest-position.

*(i) The release by the calling subscriber*

After the transmission of the message the calling subscriber depresses the release key ST which results in restoring the connection to normal in a well-known way.

It will be easily understood from the foregoing that the described arrangement allows an appreciable reduction of the possibility of faulty positioning. This will be discussed for the five unit permutation code, in which only 32 different signals are possible.

The initiation signal "figures" as well as the closing signal "+" yield a probability of $\frac{1}{32}$ each for arbitrary occurrence, while the contribution in the probability of the arbitrary occurring of the digits amount to $^{10}/_{32}$. The probability of wrong positioning of a register by disturbance or wrong keying, etc., then amounts for a six-figure system to $\frac{1}{32}\times(^{10}/_{32})^6\times\frac{1}{32}=$ about $10^{-6}$.

The guarding can be rendered nearly absolute by providing the junction circuit with a KV relay (Fig. 3). After having transmitted the described selecting criteria the calling subscriber may not press any more keys of the teleprinter keyboard because such an operation would be senseless. The calling subscriber may not begin to operate until the positioning of the selecting stages is ready, the called subscriber has been tested as not busy, and the register has started the calling subscriber's denominator, which is re-transmitted to the calling subscriber as a signal that the connection is completed.

While I have illustrated and described what I regard to be the preferred embodiment of my invention, nevertheless it will be understood that such is merely exemplary and that numerous modifications and rearrangements may be made therein without departing from the essence of the invention.

I claim:

1. In a telegraph system employing permutation code signals for the transmission of intelligence, certain of the permutation code signals designating letters and others designating digits, in combination, a telegraph subscriber's station; an automatic telegraph exchange having selecting means thereat for selecting other telegraph subscriber's stations; a register at said exchange for registering successive groups of permutation code signals designating digits representative of the selection of the other subscriber's stations; means operative from the said subscriber's station for operatively connecting said subscriber's station to the exchange and to the registers thereat for receipt by said register of said successive groups of permutation code signals transmitted from said station; means whereby said register controls said selecting means; means associated with the register for testing whether the said groups of permutation code signals entering the register include a group of said certain of the permutation signals designating letters; and means whereby the testing means upon detecting such group operatively disconnects the subscriber's station from the exchange.

2. In a telegraph system employing permutation code signals for the transmission of intelligence, certain of the permutation code signals designating letters and others designating digits, in combination, a telegraph subscriber's station; an automatic telegraph exchange having selecting means thereat for selecting other telegraph subscriber's stations; a register at said exchange for registering successive groups of permutation code signals designating digits representative of the selection of the other subscriber's stations; means operative from the said subscriber's station for operatively connecting said subscriber's station to the exchange and to the registers thereat for receipt by said register of said successive groups of permutation code signals transmitted from said station; means whereby said register controls said selecting means; a supervisory relay associated with the register for testing whether the said groups of permutation code signals entering the register include a group of said certain of the permutation signals designating letters; and means whereby said supervisory relay upon detecting such group operatively disconnects the subscriber's station from the exchange.

3. In a telegraph system employing permutation code signals for the transmission of intelligence, certain of the permutation code signals designating letters and others designating digits, in combination, a telegraph subscriber's station; an automatic telegraph exchange having selecting means thereat for selecting other telegraph subscriber's stations; a register at said exchange for registering successive groups of permutation code signals designating digits representative of the selection of the other subscriber's stations; means operative from the said subscriber's station for operatively connecting said subscriber's station to the exchange and to the registers thereat for receipt by said register of said successive groups of permutation code signals transmitted from said station; means whereby said register controls said selecting means; a supervisory relay having two windings; means for operating said two windings in opposition to each other after the reception of a signal representative of the other subscriber's stations so as to leave said supervisory relay unenergized; and means for energizing only one of said two windings by the reception of a signal from said subscriber's station not belonging to the signals representative of the other subscriber's stations so as to energize said supervisory relay, said supervisory relay upon energization thereof operatively disconnecting the subscriber's station from the exchange.

4. In a telegraph system employing permutation code signals for the transmission of intelligence, certain of the permutation code signals designating letters and others designating digits, in combination, a telegraph subscriber's station; an automatic telegraph exchange having selecting means thereat for selecting other telegraph subscriber's stations; a register at said exchange for registering successive groups of permutation code signals designating digits representative of the selection of the other subscriber's stations; means operative from the said subscriber's station for operatively connecting said subscriber's station to the exchange and to the registers thereat for receipt by said register of said successive groups of permutation code signals transmitted from said station; means whereby said register controls said selecting means; a testing relay associated with the register for testing whether the said groups of permutation code signals entering the register include a group of said certain of the permutation signals designating letters; and means whereby the testing relay upon detecting such group operatively disconnects the subscriber's station from the exchange.

5. In a telegraph system employing permutation code signals for the transmission of intelligence, certain of the permutation code signals designating letters and others designating digits, in combination, a telegraph subscriber's station; an automatic telegraph exchange having selecting means thereat for selecting other telegraph subscriber's stations; a register at said exchange for registering successive groups of permutation code signals designating digits representative of the selection of the other subscriber's stations; means operative from the said subscriber's station for operatively connecting said subscriber's station to the exchange and to the registers thereat for receipt by said register of said successive groups of permutation code signals transmitted from said station; means whereby said register controls said selecting means; a testing relay associated with the register for testing whether the said groups of permutation code signals entering the register include a group of said certain of the permutation signals designating letters; a supervisory relay having two windings; means operatively connected to said testing relay for operating said two windings in opposition to each other after the reception of a signal representative of the other subscriber's stations so as to leave said supervisory relay unenergized; and means operatively connected to said testing relay for energizing only one of said two windings by the reception of a signal from said subscriber's station not belonging to the signals representative of the other subscriber's stations so as to energize said supervisory relay, said supervisory relay upon energization thereof operatively disconnecting the subscriber's station from the exchange.

6. In a telegraph system employing permutation code signals for the transmission of intelligence, certain of the permutation code signals designating letters and others designating digits, each of said permutation code signals including a start signal followed by a plurality of selecting signals followed by a stop signal, in combination a telegraph subscriber's station; an automatic telegraph exchange having selecting means thereat for selecting other telegraph subscriber's stations; a register at said exchange for registering successive groups of permutation code signals designating digits representative of the selection of the other subscriber's stations; means operative from the said subscriber's station for operatively connecting said subscriber's station to the exchange and to the registers thereat for receipt by said register of said successive groups of permutation code signals transmitted from said station; means whereby said register controls said selecting means; a supervisory relay associated with said register for checking the selecting signals received by said register; a first testing relay connected to said supervisory relay, said first testing relay checking the start signal; a circuit energizing said supervisory relay, said circuit being under control of said first testing relay; and a second testing relay connected to said supervisory relay and being energized by the stop signal, said second testing relay having an armature initiating the operation of said means controlling said selecting means.

ROELOF M. M. OBERMAN.

REFERENCES CITED

The following references are of record in the file of this patent:

UNITED STATES PATENTS

| Number | Name | Date |
|---|---|---|
| 1,588,764 | Lubberger | June 15, 1926 |
| 2,184,836 | Helmert | Dec. 26, 1939 |
| 2,211,927 | Griffins | Aug. 20, 1940 |
| 2,216,610 | Culbertson | Oct. 1, 1940 |

FOREIGN PATENTS

| Number | Country | Date |
|---|---|---|
| 197,503 | Great Britain | May 17, 1928 |